(12) United States Patent
Magi et al.

(10) Patent No.: US 9,842,334 B1
(45) Date of Patent: Dec. 12, 2017

(54) IDENTIFYING RISKY TRANSACTIONS

(71) Applicant: EMC Corporation, Hopkinton, MA (US)

(72) Inventors: Triinu Magi, Herzeliya (IL); Harel Efraim, Hod-Hasharon (IL); Ayelet Biger Levin, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 13/720,294

(22) Filed: Dec. 19, 2012

Related U.S. Application Data

(63) Continuation-in-part of application No. 13/340,829, filed on Dec. 30, 2011.

(51) Int. Cl.
*G06Q 40/08* (2012.01)
*G06Q 20/00* (2012.01)
*G06Q 20/38* (2012.01)

(52) U.S. Cl.
CPC ................... *G06Q 20/382* (2013.01)

(58) Field of Classification Search
CPC .... G06Q 20/00; G06Q 30/02; G06Q 10/0635; G06Q 20/4016; G06Q 20/3224; G06Q 40/08; G06F 17/30; G06F 17/22; G06C 20/4016; G06C 20/3224
USPC .................. 705/44, 14.58; 342/357; 707/754
See application file for complete search history.

(56) References Cited

U.S. PATENT DOCUMENTS

| | | | |
|---|---|---|---|
| 7,908,645 B2 * | 3/2011 | Varghese et al. ................ 726/4 |
| 9,002,859 B1 * | 4/2015 | Ward ................ G06F 17/30961 |
| | | | 707/754 |
| 2007/0171124 A1 * | 7/2007 | Weill ....................... 342/357.06 |
| 2010/0001997 A1 * | 1/2010 | Kajikawa et al. ............ 345/419 |
| 2012/0158509 A1 * | 6/2012 | Zivkovic et al. .......... 705/14.58 |

* cited by examiner

*Primary Examiner* — Hao Fu
(74) *Attorney, Agent, or Firm* — Krishnendu Gupta; Jason A. Reyes

(57) ABSTRACT

A technique identifies risky transactions by mapping raw user location data to a particular cell in a fixed grid. Along these lines, when a user initiates a transaction with a service provider over a mobile device, the service provider collects raw location data such as a latitude and longitude for the user and transmits the location data to an adaptive authentication server. The adaptive authentication server then accesses a fixed set of geographical areas overlaid on a map of the Earth. The adaptive authentication server finds a particular geographical area which contains the latitude and longitude for the user. The adaptive authentication server also obtains information in connection with previous transactions in the particular geographical area using the identifier of the particular geographical area to obtain the information. Based on this information, the adaptive authentication server determines the riskiness of the particular geographical area. Based on the riskiness, the adaptive authentication server assigns a risk score to the transaction.

18 Claims, 5 Drawing Sheets

| USERNAME | DEVICE TYPE | GEOLOCATION | DATE | TIME | AUTHENTICATION RESULT |
|---|---|---|---|---|---|
| USER A | BLACKBERRY | 50(5) | MONDAY | 14:00 | PASS |
| USER A | BLACKBERRY | 50(5) | TUESDAY | 14:15 | PASS |
| USER A | iPHONE | 50(5) | WEDNESDAY | 02:00 | FAIL |
| USER B | BLACKBERRY | 50(18) | MONDAY | 10:20 | PASS |
| USER B | iPHONE | 50(5) | TUESDAY | 02:50 | FAIL |
| USER B | iPHONE | 50(5) | WEDNESDAY | 03:00 | FAIL |

FIG. 4

IDENTIFYING RISKY TRANSACTIONS

RELATED APPLICATION

This application is a continuation-in-part application claiming priority to co-pending U.S. patent application Ser. No. 13/340,829, filed Dec. 30, 2011, reference no. EMC-11-516, entitled "METHOD OF DEFINING THE USER'S GEOGRAPHIC AREAS FOR RISK ASSESSMENT PURPOSES IN MOBILE CHANNELS", the entirety of which patent application is hereby incorporated by reference herein.

TECHNICAL FIELD

The present invention relates to identifying risky transactions.

BACKGROUND OF THE INVENTION

Some service providers use conventional risk-based authentication systems to assess risks of processing customer transactions. For example, an online bank may employ a risk engine of such a risk-based authentication system to assign risk scores to banking transactions where higher risk scores indicate higher risk.

In generating a risk score, the risk engine takes, as input values, various transaction attributes (e.g., time of receipt, IP address). For each customer of the online bank, there is an associated history based on values of the transaction attributes associated with previous transactions involving that customer. The risk engine incorporates the history associated with the customer into an evaluation of the risk score. Significant variation of one or more attribute values from those in the customer's history may signify that the banking transaction has a high risk.

For example, suppose that a particular customer historically submitted transaction requests to the online bank at 3:00 PM from a particular internet service provider (ISP), and, under the customer's identifier, a user submits a new transaction request at 2:00 AM from a different ISP. The different ISP would give rise to a different IP address than that historically associated with the particular customer. In this case, owing to the different IP address and the unusual time that the transaction was submitted, the risk engine would assign a larger risk score to a transaction resulting from the new transaction request.

Unfortunately, there are deficiencies with the above-described conventional risk-based authentication systems. For example, an IP address can be used to determine an approximate geolocation from which a user connected to a network via an ISP submits a transaction request. However, for a user conducting a transaction from a mobile device, geolocation is typically derived from a cell tower identifier or GPS coordinates.

Because of the nature of data gathering from cell towers and GPS units in mobile devices, it is possible that a risk-based authentication system could perceive a small change in location as a large change and therefore deem it risky. In particular, a typical resolution for geolocation from GPS coordinates is about 25 meters, although this number can vary. The translation of GPS coordinates into a geolocation at such a resolution is frequently very sensitive to noise and other external factors. For example, at one instant, a first user conducts a transaction with the mobile device facing north, resulting in a geolocation from the GPS coordinates that includes a first address. A second user conducts another transaction from the same location with the mobile device facing east, resulting in a geolocation from slightly different GPS coordinates that includes a second address differing from the first address. The second address may be a few meters or as far as several kilometers away from the first address. Similar problems also exist in non-GPS methods of collecting geolocation such as cell tower triangulation. For example, two users in a city having many cell towers can have cell signals point to different cell towers despite the users being a few centimeters apart; such users would be assigned geolocations much further apart than their actual locations.

Such hypersensitivity to noise and other external factors presents a problem for conventional risk-based authentication systems. Because the conventional risk-based authentication systems described above rely on previous behavior of attributes such as geolocation, a noisy history of geolocation may lead to inaccurate risk scores being assigned to transactions. In other words, when the process of obtaining geolocation is excessively noisy and therefore unrepeatable, conventional risk-based authentication systems may create a large number of false positives, undermining the ability to identify the riskiest transactions.

Additionally, it should be understood that some conventional risk-based authentication systems can also assign a high risk to transactions from a certain international region. For example, the systems may assign a high risk to all transactions from a country in the region due to social, economic and/or geopolitical reasons in the country.

However, this imprecise approach can lead to all transactions emanating from the country being treated in a similar manner regardless of the veracity of the transaction. This approach can deprive customers in the country the opportunity to perform a transaction due to circumstances outside of their control.

SUMMARY OF THE INVENTION

There is disclosed a technique that in one embodiment is directed to a method of identifying risky transactions. The method includes generating a set of geographical areas, each geographical area of the set of geographical areas including an area identifier and being fixed with respect to the Earth's surface. The method also includes receiving, from a service provider, a transaction which includes location data of a user device in communication with the service provider, the location data corresponding to a single point on the Earth's surface. The method further includes mapping the location data to a particular geographical area of the set of geographical areas. The method further includes obtaining information in connection with previous transactions in the particular geographical area based on the area identifier of the particular geographical area. The method further includes determining the riskiness of the particular geographical area based on the obtained information in connection with previous transactions. The method further includes generating an authentication result based on the determined riskiness of the particular geographical area, the authentication result including a risk score indicative of a likelihood that the transaction is risky. The method further includes sending the authentication result to the service provider.

Additionally, some embodiments of the technique are directed to an apparatus for identifying risky transactions. The system includes a network interface coupled to a network, a memory and processor coupled to the memory, the processor configured to carry out the method of identifying risky transactions.

Furthermore, some embodiments of the improved technique are directed to a computer program product having a non-transitory computer readable storage medium which stores code including a set of instructions to carry out the method of identifying risky transactions.

BRIEF DESCRIPTION OF THE DRAWINGS

Features and advantages of the present invention will become more apparent from the following detailed description of exemplary embodiments thereof taken in conjunction with the accompanying drawings in which:

FIG. 4 is a schematic diagram illustrating a portion of the entries in the database stored in the storage device shown in FIG. 1.

DETAILED DESCRIPTION

The technique described below identifies risky transactions by mapping raw user location data to a particular cell in a fixed grid. Along these lines, when a user initiates a transaction with a service provider over a mobile device, the service provider collects raw location data such as a latitude and longitude for the user and transmits the location data to an adaptive authentication server. The adaptive authentication server then accesses a fixed set of geographical areas overlaid on a map of the Earth. For example, the geographic areas can correspond to square cells whose corners are defined by selected latitudes and longitudes. The adaptive authentication server finds a particular geographical area which contains the latitude and longitude for the user. The adaptive authentication server then obtains information in connection with previous transactions in the particular geographical area using the identifier of the particular geographical area to obtain the information. Based on this information, the adaptive authentication server determines the riskiness of the particular geographical area. The adaptive authentication server assigns a risk score to the transaction based on the riskiness of the particular geographical area.

The technique described herein can store information such as the hits in a geographic area as well as the fraud and authentication feedback for the geographic area. By storing such information, it is possible to determine the riskiness of the geographic area such that an appropriate risk level can be correlated to the geographic area. If a certain geographic area has a strong correlation with risky behavior then the area can be marked as a high risk area. It will be understood that transactional events that occur from within the defined high risk area can get a higher risk score. Similarly, if the geographic area has a high volume of non risky behavior or passed authentication events then it can indicate a low risk area. The transactional events from a low risk area will get a lower risk score.

Figure 1:
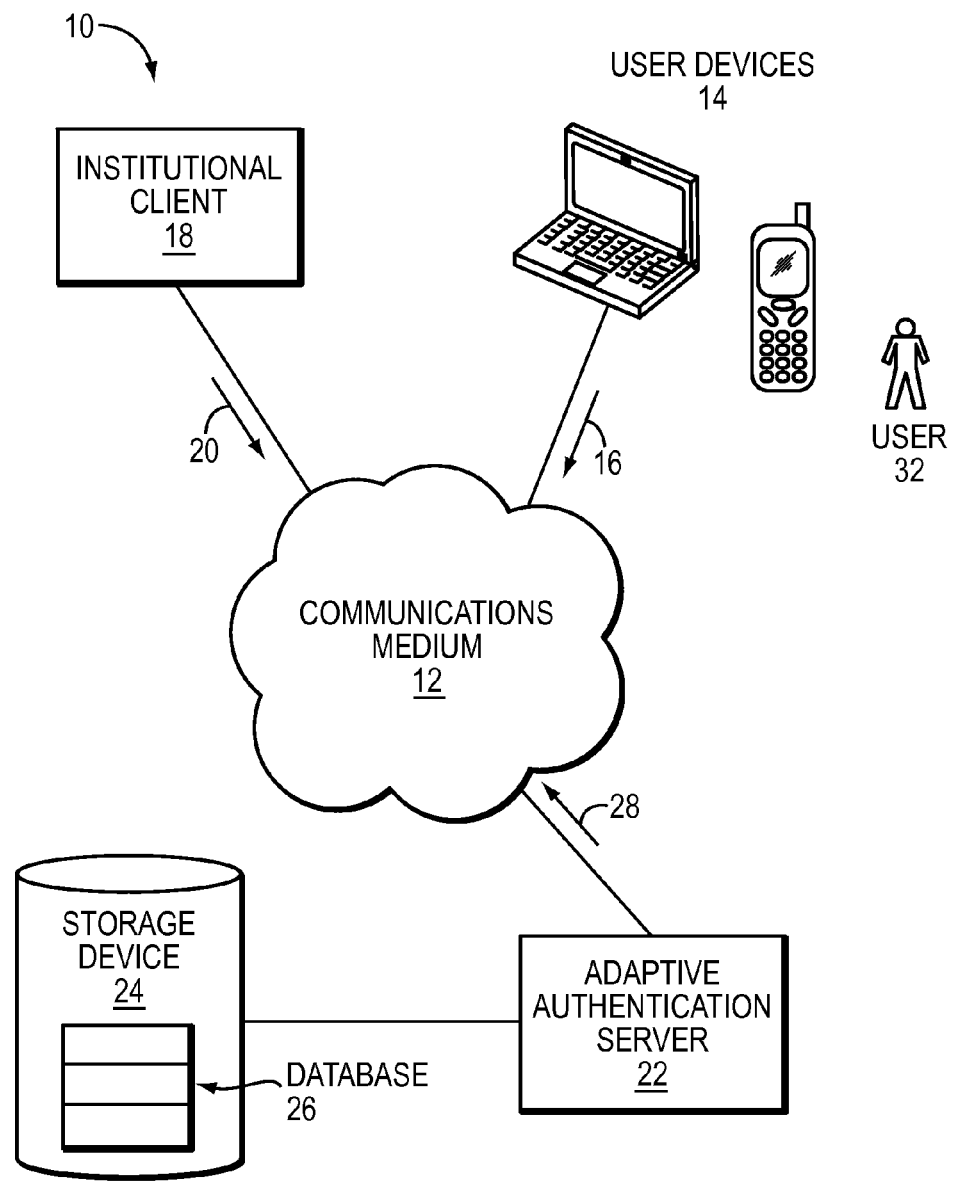
FIG. 1 is a schematic diagram illustrating an electronic environment for carrying out the technique.

Referring to FIG. 1, there is illustrated an electronic environment 10 for carrying out the technique. Electronic environment 10 includes communications medium 12, user devices 14, institutional client 18, and adaptive authentication server 22.

Communication medium 12 provides network connections between user devices 14, institutional client 18, and adaptive authentication server 22. Communications medium 12 may implement a variety of protocols such as TCP/IP, UDP, ATM, Ethernet, Fibre Channel, combinations thereof, and the like. Furthermore, communications media 12 may include various components (e.g., cables, switches/routers, gateways/bridges, NAS/SAN appliances/nodes, interfaces, etc.). Moreover, the communications medium 12 are capable of having a variety of topologies (e.g., queue manager-and-spoke, ring, backbone, multi drop, point to-point, irregular, combinations thereof, and so on).

User devices 14 include smartphones, personal digital assistants, laptop computers, desktop computers, tablet computers, and the like constructed and arranged to submit transaction request 16 to institutional client 18 via communications medium 12.

Institutional client 18 is constructed and arranged to send transaction 20 to adaptive authentication server 22 via communications medium 12. Institutional client 18 is also constructed and arranged to obtain geolocation data from transaction request 16. Institutional client 18 is further constructed and arranged to receive adaptive authentication result 28 from adaptive authentication server 22.

Adaptive authentication server 22 is constructed and arranged to receive transaction 20 from institutional client 18 over communications medium 12, including user location data. Adaptive authentication server 22 is also constructed and arranged to map user location data to a geographical area having an identifier. Adaptive authentication server 22 is also constructed and arranged to access information concerning previous transactions in database 26 stored on storage device 24. Adaptive authentication server 22 is further constructed and arranged to generate adaptive authentication results 28. Adaptive authentication server 22 is further constructed and arranged to send adaptive authentication results 28 to institutional client 18.

During operation, a user 32 on user device 14 can submit a transaction request 16 under a customer's user identifier to institutional client 18 via communications medium 12. From transaction request 16, institutional client 18 can acquire longitude and latitude information for user device 14. For example, if user device 14 is a smartphone with a GPS unit, institutional client 18 can derive a single longitude and latitude point from GPS coordinates embedded within transaction request 16. Institutional client 18 can then send transaction 20 to adaptive authentication server 22 in order to obtain authentication results concerning user 32.

Adaptive authentication server 22, prior to institutional client 18 receiving transaction request 16, can generate a set of geographical areas fixed with respect to the Earth's surface. Each of the geographical areas can have an identifier by which adaptive authentication server 22 refers to the geographical area. For example, adaptive authentication server 22 can break the Earth's surface into equally-sized grids and each of the geographical areas can take the form of a spherical square. Each side of the spherical square can subtend an equiangular range of longitude or latitude. Adaptive authentication server 22 can store the generated set of geographical areas in database 26.

Adaptive authentication server 22 can receive transaction 20 and search transaction 20 for the single longitude and latitude point. Adaptive authentication server 22 can then access, from database 26, an array of geographical areas representing a division of the Earth's surface. For example, the array of geographical areas can be stored in the database as a set of fixed latitude and longitude coordinates defining a grid of fixed areas which cover the Earth's surface. Each fixed area can be a spherical square as described above.

It should be understood that, when the geographical areas are small compared to the Earth's surface, the spherical squares can be essentially squares with sides of equal distance.

Adaptive authentication server 22 can then find a particular geographical area that contains the single longitude and latitude point. Computational geometric methods exist that identify a particular area that contains a given point in the more general case of the particular area being defined as a polygon via a set of vertices. Such methods extend to the example of the spherical square, although adaptive authentication server 22 can use simpler methods in this case.

It should be understood that each geographical area has an identifier by which adaptive authentication server 22 identifies the area in database 26. Along these lines, adaptive authentication server 22 can use such identifiers to track geolocation behavior for user 32 and, consequently, the risk score assignment can be based on such geolocation behavior.

It will be understood from the above that the adaptive authentication server 22 can use the identifier from the particular geographical area that identifies the location of user 32 to assign a risk score to transaction 20. Once the risk score is assigned, adaptive authentication server 22 can then send authentication result 28 which contains the risk score assigned to transaction 20 to institutional client 18.

Advantageously, this can allow for a more accurate computation of risk score from location data of user 32. By identifying the single longitude and latitude point as being within a particular geographical area having an identifier, the behavior of the location of user 32 can be desensitized to small changes in location. This desensitizing of the location of user 32 can increase the accuracy of adaptive authentication. For example, suppose that a particular region is 10 km by 10 km and includes a home of user 32. Suppose that, on two separate occasions, user 32 initiates transaction request 16 from his home; the raw location data provides locations near the house, but 500 meters apart. Nevertheless, the two locations are within the particular region, so that the geolocation data does not change in this instance, as expected.

Figure 2:
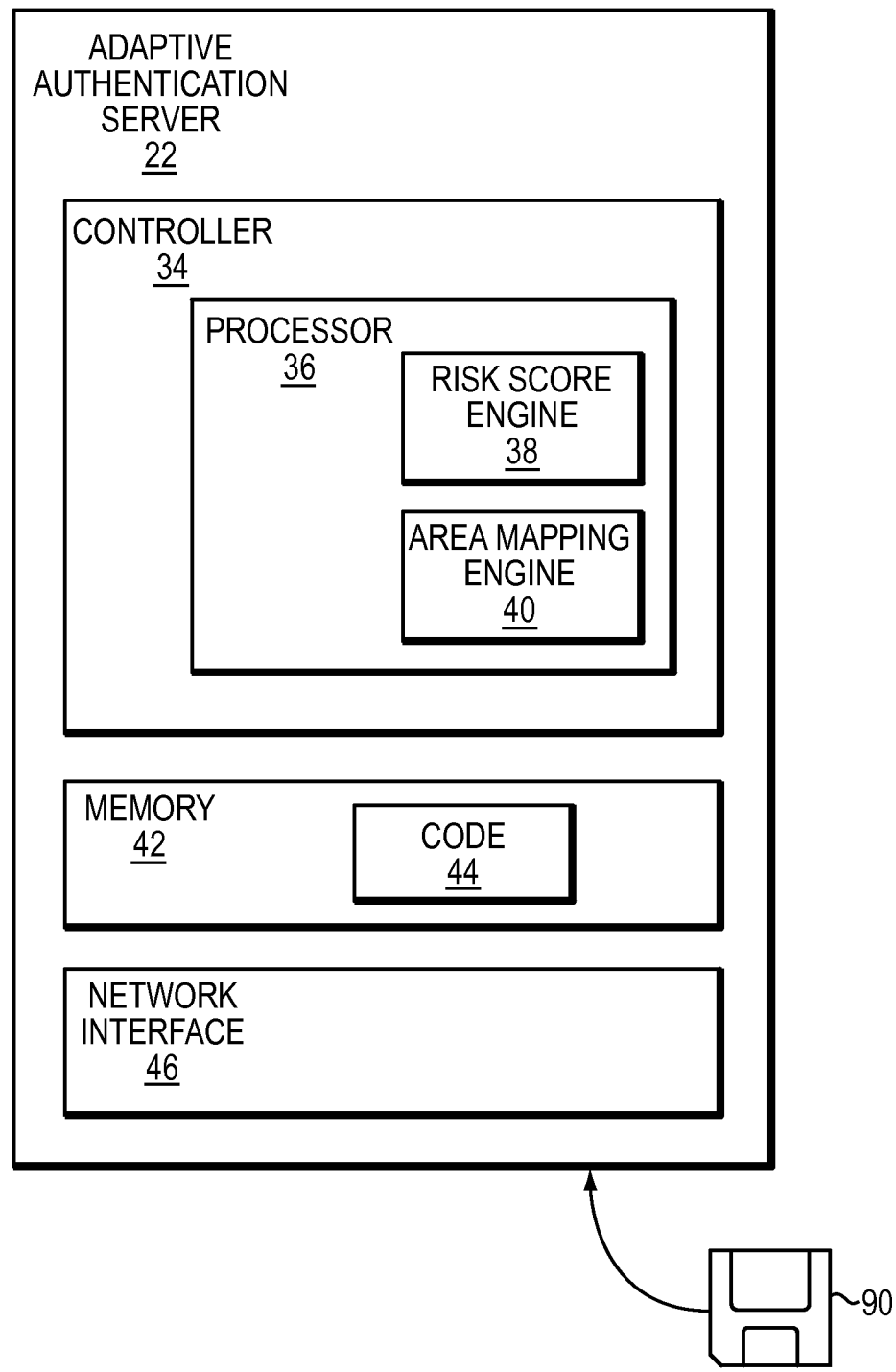
FIG. 2 is a schematic diagram illustrating the adaptive authentication engine within the electronic environment shown in FIG. 1.

Further details concerning adaptive authentication server 22 are considered with respect to FIG. 2.

Referring to FIG. 2, there is illustrated some components of adaptive authentication server 22. Adaptive authentication server 22 includes a controller 20, which in turn includes processor 22, a memory 24 and a network interface 26.

Memory 42 can be configured to store code which includes code 44 constructed and arranged to identify risky transactions. Memory 42 can also configured to store transaction 20 received from institutional client 18. Memory 42 generally takes the form of, e.g., random access memory, flash memory or a non-volatile memory.

Processor 36 can take the form of, but is not limited to, Intel or AMD-based MPUs, and can include a single or multi-cores each running single or multiple threads. Processor 36 can be coupled to memory 42 and can be configured to execute instructions from code 44 stored in memory 42. Processor 36 can also include risk score engine 38 and area mapping engine 40.

Risk score engine 38 can be constructed and arranged to assign a risk score to a transaction based on factors such as values of attributes of previous transactions, transaction 20 stored in memory 42 and an identifier of a geographical area. The risk score engine 38 can also assign a risk score based on other factors such as the riskiness of the geographical area from where the user 32 submits the transaction request.

Area mapping engine 40 can be constructed and arranged to generate a fixed set of geographical areas and store the set in database 26. Area mapping engine 40 can also be constructed and arranged to map longitude and latitude points to a particular geographical area.

Network interface 46 can be constructed and arranged to send and receive data over communications medium 12. Specifically, network interface 46 can be configured to receive transaction 20 from institutional client 18 over communications medium 12 and to send transaction result 28 to institutional client 18 over communications medium 12. Also, network interface 42 can be constructed and arranged to receive data from storage device 15.

During operation, area mapping engine 40 can generate a set of geographical areas, each having an identifier, fixed with respect to the Earth's surface. In some arrangements, area mapping engine 40 can create a fixed grid defined by selected longitude and latitude points; the set of geographical areas can be defined by sets of such points, each set can define a set of vertices for the geographical area. Along these lines, the geographical areas can be essentially the same size and shape; for example, the spherical squares described above. Area mapping engine 40 can assign identifiers to each geographical area; the identifiers can be a number to which risk score engine 38 can refer when assigning risk scores to transactions. Area mapping engine 40 can store information concerning the generated geographical areas in database 26.

Figure 3:
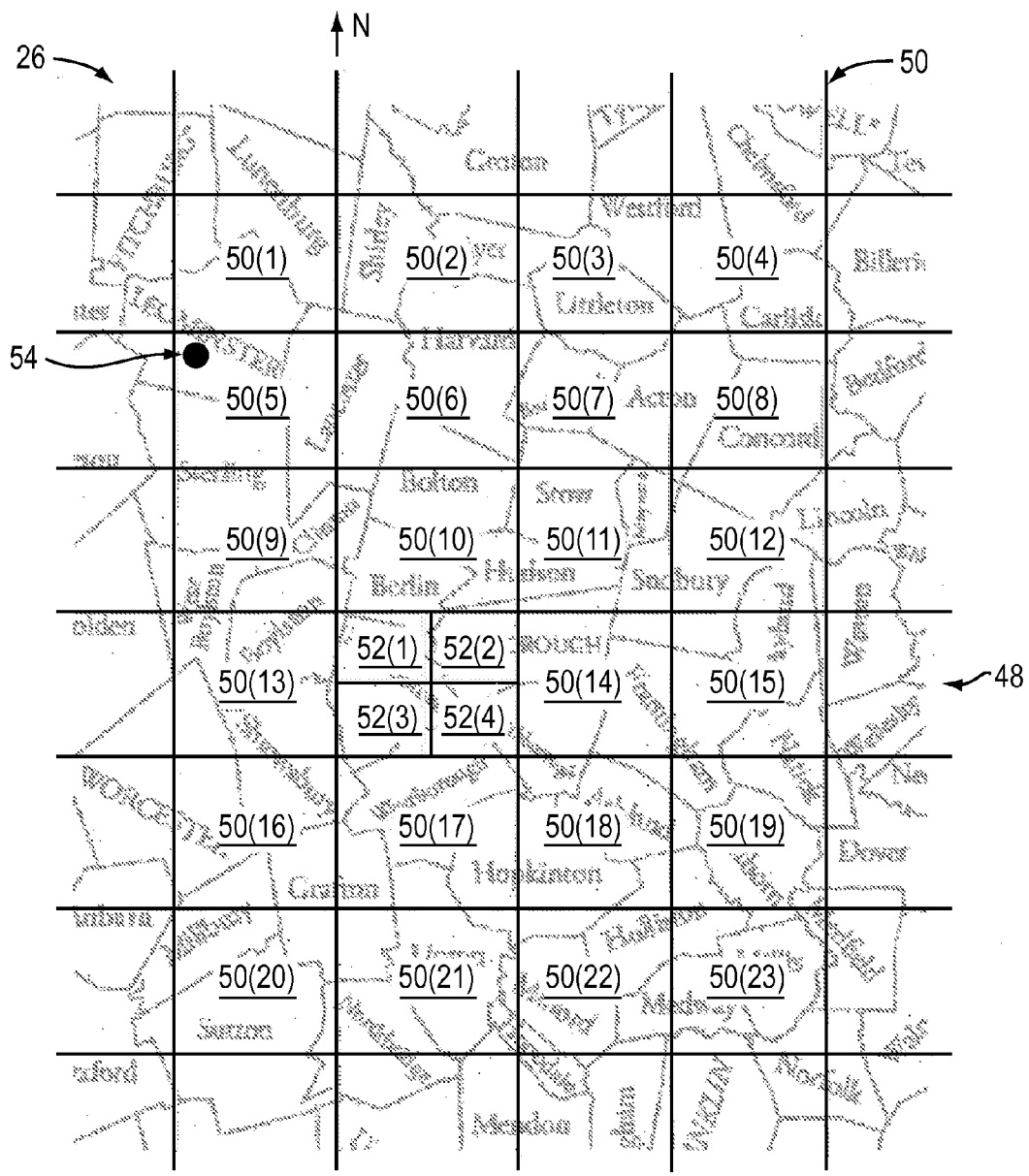
FIG. 3 is a schematic diagram illustrating a mapping of raw location data to a particular geographical area of a set of geographical areas stored in the database shown in FIG. 1.

Further details of the fixed grid that can be generated by area mapping engine 40 will be considered with respect to FIG. 3.

Referring to FIG. 3, there is illustrated an example of a set of geographical areas 48 being mapped to a part of the Earth's surface. In this particular example, a set of grid lines of a grid 50 which correspond to longitude and latitude lines are overlaid on a map of eastern central Massachusetts. Each vertex of grid 50 corresponds to a geographical area defines by the grid lines of grid 50. The geographical areas here are congruent spherical squares as the grid lines run parallel to longitude and latitude lines.

Each geographical area of grid 50 has an identifier assigned to it by area mapping engine 40; the identifiers are denoted in FIG. 3 by the number in parenthesis within the respective geographical area. For example, the area 50(1) has the identifier 1, 50(2) has the identifier 2, and so on. The areas are stored in database with reference to its four vertices (e.g., area 50(1) has vertices [41.59° N, 71.82° W], [41.65° N, 71.82° W], [41.59° N, 71.76° W], [41.65° N, 71.76° W]).

Note that the geographical areas each have sides which subtend about 0.06° from the Earth's center; at the scale presented in FIG. 3, the sides of the spherical squares have a length of about 6.5 km. In some arrangements, the sides have smaller length, e.g., 6 km, 5 km, 4 km, 3 km, 2 km, 1 km, or smaller; in other arrangements, the sides have larger length, e.g., 7 km, 8 m, 9 km, 10 km, or larger.

Sometime later, the network interface 46 can receive transaction 20. Upon the receipt, processor 36 can store its attribute values, including the value of a single longitude and latitude point 54, in memory 42. Area mapping engine 40 can take the single longitude and latitude point 54 from memory 42 and determine a particular geographical area 50(5) which contains the point 54. Area mapping engine 40 can then send the identifier of the particular geographical area 50(5) to risk score engine 38 for risk score assignment.

Risk score engine 38 can then execute instructions derived from code 44 to access the attribute values from memory 42 as well as the geographical area identifier and assigns a risk score to transaction 20. In some arrangements, the risk score can be based on a set of Bayesian weights, each of which corresponds to an attribute associated with transaction 20. Risk score engine 38 can derive the value of each Bayesian weight from values of the attribute to which the Bayesian weight corresponds for previous transactions which are stored in database 26.

In some arrangements, geographical areas of grid 50 may not be congruent and have different values of area. For example, area mapping engine 40 can scale the area of each geographical area to a local population density. In particular, the area scaling can be such that the population of each geographical area is substantially the same as any other geographical area. In FIG. 3, four subdivided regions 52(1), 52(2), 52(3), 52(4) can be equivalent to one of the other geographical areas, say, 50(1); such a subdivision can result from a larger population density than in other parts of grid 50.

In some other arrangements, area mapping engine 40 can assign weight values to each geographical area in addition to an identifier. Risk score engine 38 can use such weight values as an additional factor in assigning a risk score to transaction 20. For example, a weight value can be assigned to a geographical area in inverse proportion to a likelihood that a random user would be in that geographical area. For example, area mapping engine 40 may assign a very high weight value to a geographical area in the middle of the Atlantic Ocean, as it is very unlikely that a random user would be in this area. Conversely, area mapping engine 40 may assign a very small weight value to a large city.

It should be understood that, in the example presented in the above description, area mapping engine 40 can generate grid 50 once and bases geolocation values for all users on grid 50. In other arrangements, however, area mapping engine 40 can generate a separate grid for different users. For example, suppose that user 32 lives in the area 50(10) and works in area 50(11). For user 32, area mapping engine 40 can create a single area from these two areas. A benefit of such customization is that it simplifies the analysis required for assigning a risk score to transaction 20. That is, transaction requests 16 occurring outside of the "home" area of user 32 are more likely to contribute to a high risk score than if user 32 had several "home" areas.

In still other arrangements, area mapping engine 40 can associates a set of areas, not necessarily contiguous, to user 32. For example, user 32 may be a business traveler that frequently visits several distinct regions around the Earth. These several distinct regions form the set of areas associated with the business traveler. Further, risk score engine 38 considers risky a transaction from this business traveler originating from an area not belonging to the set of areas.

Further, area mapping engine 40 can customize weights assigned to areas for different users. For example, suppose that user 32 travels internationally with a high frequency, and sends transaction requests while in the plane, over an ocean. Area mapping engine 40 can assign weights to the areas over the ocean that are not as high as the values described above.

In still further arrangements, the riskiness of the geographical area from where the user submits the transaction request can also be factor in assigning a risk score to transaction 20. For example, the processor 36 can send a command to the storage device 24 via network interface 46 to perform a lookup operation on database 26. In this particular case, the lookup operation can be configured to return information concerning previous transactions in the geographical area having identifier 50(5). In this case, the network interface 46 can receive the information concerning previous transactions. The processor 36 can identify the transactions in the geographical area 50(5) that have failed authentication. These transactions can be assumed to be indicative of fraud or risk in the geographical area 50(5). Processor 36 can then determine the riskiness of the geographical area 50(5) by computing the amount/percentage of previous transactions that processor 36 assumed to be indicative of fraud or risk in the geographical area 50(5). Risk score engine 38 can then access this amount/percentage for use in assigning a risk score to transaction 20. Further details of this aspect will now be illustrated and described with regard to FIGS. 4 and 5.

Referring to FIG. 4, there is illustrated an example of a portion 60 of database 26 stored in storage device 24. The database 26 contains a set of entries with each entry being associated with a transaction for either user A or B. Beside username field 61, the fields of database 26 include device type 62, geolocation 63, date 64 of transaction, time 65 of transaction and authentication result 66 associated with the transaction.

Turning to the entries referring to User A, the first two transactions occur on Monday and Tuesday at roughly the same time of the day at geographical location 50(5). The user also used the same device. It should be understood that these transactions were subjected to risk assessment by the adaptive authentication server 22 in order to ascertain the riskiness of the transactions. It will be appreciated that in this embodiment the transactions passed authentication due to the transactions emulating a user's history of transactions as stored in the database 26.

However, the transaction on Wednesday was received at an early hour in the morning rather than in the afternoon. This is unusual for the user. The transaction also originated from an iPhone rather than a Blackberry. Because the user historically used a Blackberry in the afternoon to perform a transaction, this transaction was identified as risky and failed authentication.

Turning now to User B, the first transaction took place on Monday in geographical area 50(18). This transactions passed authentication as the transaction emulated the user's normal transaction history. On Tuesday and Wednesday, however, there were transactions at unusual times from a different user device at a different geographical location 50(5). It will be understood that these transactions failed authentication.

Following on from the above, the lookup operation as described above can return information from the database 26 relating to previous transactions in the particular geographical area 50(5). In this example, the operation returns the three transactions relating to User A and the final two transactions relating to User B. It should also be understood that the processor 36 can identify the transactions that have failed authentication. In this case, the final transaction relating to User A and the final two transactions relating to User B will be identified. These transactions will be assumed to be indicative of fraud or risk in the geographical area 50(5). Processor 36 can then determine the riskiness of the geographical area 50(5) by computing the percentage of previous transactions that are assumed to be indicative of fraud or risk in the geographical area 50(5). The percentage of risky transactions in this example is sixty percent. It should be understood that a percentage in excess of a threshold such as ten percent can deem the area as a high risk area. Risk score engine 38 can then access this percentage or an equivalent thereof for use in assigning a risk score to transaction 20.

In some arrangements, the processor 36 can also assign a high risk to at least one geographical area adjacent to the particular geographical area 50(5) in response to the processor 36 determining a high risk in the particular geographical area 50(5) due to a large amount of failed authentication attempts in the area. For example, if the processor determines that geographical area 50(5) is high risk, the processor 36 can also assign a high risk to one or more of the geographical areas 50(1), 50(2), 50(6), 50(9) and 50(10) adjacent to risky geographical area 50(5). In some cases, the adjacent areas may not currently be risky areas. However, the borders of the risky area 50(5) can in this instance be extended to ensure that the risk does not move into adjacent areas.

In other arrangements, the processor 36 can also assign a high risk to a region within the geographical area 50(5) in response to the majority of failed authentication attempts emanating from the region in the geographical area 50(5). For example, the amount of failed authentication attempts outside of the region in the geographical area 50(5) may not be high. However, the amount of failed authentication attempts from longitudes and latitudes in the said region may be high. In this case, the processor 36 may assign a high risk to the region in the geographical area 50(5) only.

In further arrangements, it should be understood that the authentication result field as described above can include the actual risk score for the previous transactions rather than a 'PASS' or 'FAIL'. In the event that the risk score is included in the field, the processor 36 can determine that the authentication result is equivalent to a failed authentication in response to the risk score in the field not exceeding a threshold.

Figure 5:
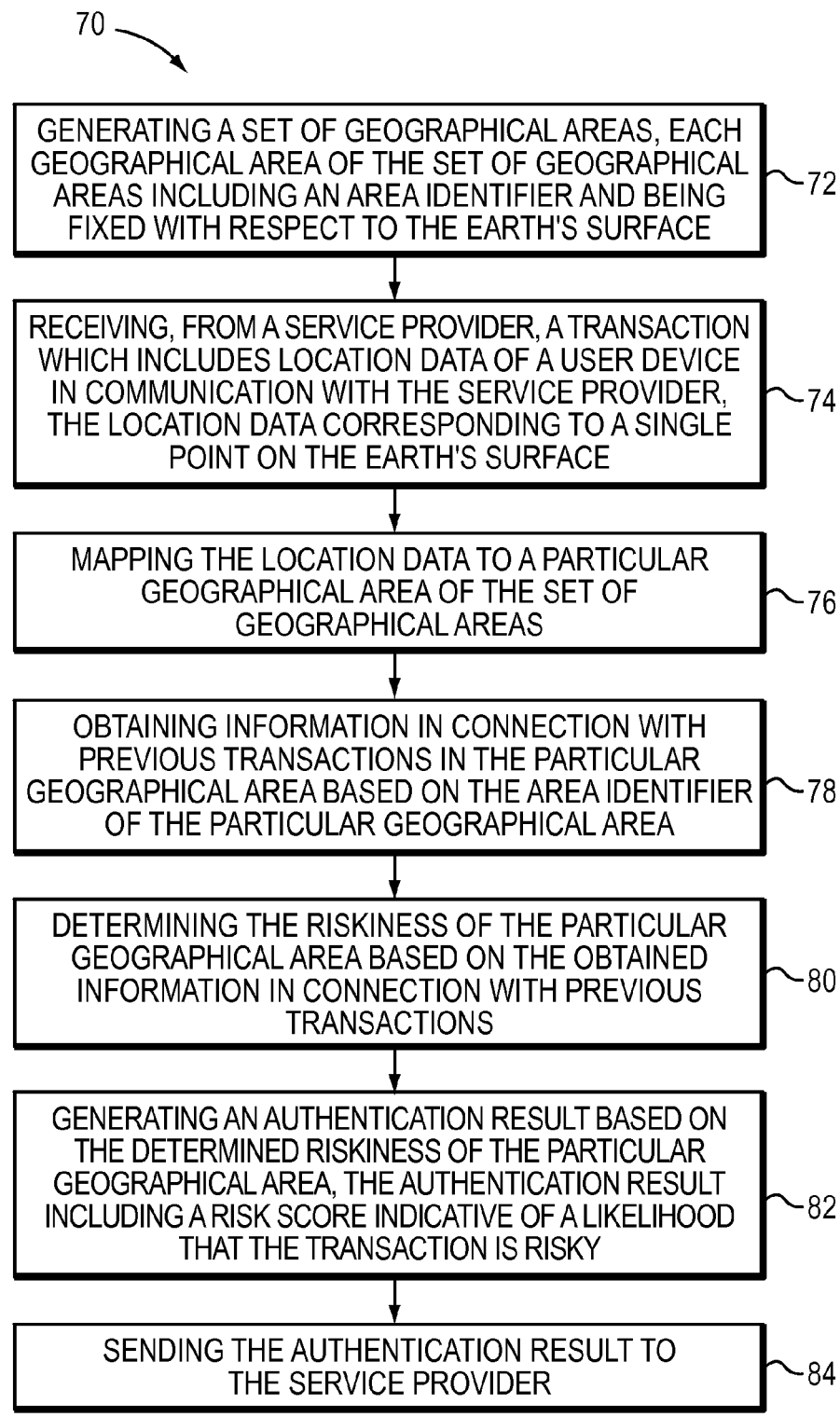
FIG. 5 is a flow chart illustrating a method of carrying out the technique within the electronic environment shown in FIG. 1.

Referring to FIG. 5, there is illustrated a method 70 of identifying risky transactions. In step 72, a set of geographical areas is generated, each geographical area of the set of geographical areas including an area identifier and being fixed with respect to the Earth's surface. In step 74, a transaction is received from a service provider, the transaction including location data of a user device in communication with the service provider, the location data corresponding to a single point on the Earth's surface. In step 76, the location data is mapped to a particular geographical area of the set of geographical areas. In step 78, information is obtained in connection with previous transactions in the particular geographical area based on the area identifier of the particular geographical area. In step 80, the riskiness of the particular geographical area is determined based on the obtained information in connection with previous transactions. In step 82, an authentication result is generated based on the determined riskiness of the particular geographical area, the authentication result including a risk score indicative of a likelihood that the transaction is risky. In step 84, the authentication result is sent to the service provider.

While various embodiments of the invention have been particularly shown and described, it will be understood by those skilled in the art that various changes in form and details may be made therein without departing from the spirit and scope of the invention as defined by the appended claims.

For example, while the above description illustrated an area mapping engine 40 within adaptive authentication server 22, area mapping engine 40 could also work within institutional client 18. In this case, transaction 20 would contain an area identifier for user 32. Based on the area identifier in transaction 20, risk score engine 38 assigns a risk score to transaction 20.

Furthermore, it should be understood that some embodiments are directed to adaptive authentication server 22 which is constructed and arranged to identify risky transactions. Some embodiments are directed to adaptive authentication server 22. Some embodiments are directed to a system which identifies risky transactions. Some embodiments are directed to a process of identifying risky transactions. Also, some embodiments are directed to a computer program product which enables computer logic to identify risky transactions.

In some arrangements, adaptive authentication server 22 is implemented by a set of processors or other types of control/processing circuitry running software. In such arrangements, the software instructions can be delivered to adaptive authentication server 22 in the form of a computer program product 90 (FIG. 2) having a computer readable storage medium which stores the instructions in a non-volatile manner. Alternative examples of suitable computer readable storage media include tangible articles of manufacture and apparatus such as CD-ROM, flash memory, disk memory, tape memory, and the like.

What is claimed is:

1. A method of performing computerized authentication, comprising:

generating, by a computer processor, a set of geographical areas, each geographical area of the set of geographical areas (i) representing a fixed region bounded by a polygon having at least three latitude-longitude vertices on the Earth's surface and (ii) including an area identifier that uniquely identifies the geographical area from among other geographical areas;

assigning, by the computer processor, weights to each of the set of geographical areas, wherein each geographical area of the set of geographical areas includes a weight value that is inversely proportional to a likelihood of an electronic transaction being received from within that geographical area, an increasing weight value of a geographical area increasing a risk score assigned to the electronic transaction taking place within that geographical area, further wherein the weight value of one or more geographical areas of the set of geographical areas corresponds to a value less than any of the weight values of the other geographical areas of the set of the geographical areas based on previous electronic transactions received from within the one or more geographical areas being associated with a user device and/or a user of the user device;

receiving, from a service provider and by the computer processor over a network, an electronic transaction relating to a computerized resource, the electronic transaction comprising GPS (Global Positioning Satellite) coordinates as location data of the user device in communication with the service provider, the location data corresponding to a single point on the Earth's surface as identified by the GPS coordinates;

based on the received location data, identifying, by the computer processor, a geographical area of the set of geographical areas, wherein the said identifying comprises mapping the location data to a particular geographical area of the set of geographical areas based on the GPS coordinates falling within the polygon bounded by the latitude-longitude vertices of the particular geographical area, the particular geographical area encompassing multiple GPS coordinates all of which map to the particular geographical area;

upon identifying the particular geographical area, determining, by the computer processor, geographical areas of the set of geographical areas adjacent the particular geographical area, each of the adjacent geographical areas encompassing multiple GPS coordinates;

determining, by the computer processor, the riskiness of the particular geographical area and the adjacent geographical areas, wherein the said determining comprises assessing previous electronic transaction from multiple users to determine an amount of fraud as a percentage of the total electronic transactions in the particular geographical area and the adjacent geographical areas;

generating, by the computer processor, an authentication result in connection with the electronic transaction, wherein the said generating of the authentication result comprises determining a risk score by analyzing the riskiness of the particular geographical area and the adjacent geographical areas in addition to analyzing a weight value associated with the particular geographical area; and sending, by the computer processor over the network, the authentication result to the service provider;

wherein generating the set of geographical areas further includes:
  determining a population associated with geographic areas in the set of geographical areas; and
  based on the said determination, scaling a first geographical area of the set of geographical areas such that the first geographical area is subdivided into subdivisions as a result of the first geographical area having a larger population than another geographic area in the set of geographical areas.

2. A method according to claim 1, wherein the set of geographical areas are mutually exclusive;
  wherein identifying the geographical area includes:
    producing, as the geographical area, the geographical area in which a single point of the Earth's surface is included.

3. A method according to claim 2,
  wherein producing the geographical area in which the point of the Earth's surface is included includes:
    selecting, as the geographical area, the geographical area having the set of vertices which form a polygon that includes the single point of the Earth's surface.

4. A method according to claim 3, wherein the each geographical area of the set of geographical areas includes, as the set of vertices, four vertices which form, as the polygon, a spherical square having four edges and a center, each edge of the spherical square being parallel to either a longitude line of the Earth or a latitude line of the Earth; and
  wherein generating the set of geographical areas includes:
    assigning an area identifier of each geographical area of the set of geographical areas based on the latitude and longitude of the center of the spherical square.

5. A method according to claim 1, wherein information in connection with previous transactions is stored in a database, an entry in the database for a previous transaction including a field for the area identifier and the authentication result;
  wherein determining the riskiness of the identified geographical area includes:
    sending a command to perform a lookup operation in the database for previous transactions having an area identifier being equal to the area identifier of the geographical area; and
    receiving the previous transactions having an area identifier being equal to the area identifier of the geographical area in response to the lookup operation.

6. A method according to claim 5, wherein determining the riskiness of the geographical area includes:
  identifying, in the received previous transactions, the transactions having an authentication result indicative of risk; and
  producing an amount of the transactions having an authentication result indicative of risk in response to identifying the transactions having an authentication result indicative of risk.

7. A system of performing computerized authentication, comprising:
  a network interface;
  a memory; and
  a controller which includes controlling circuitry coupled to the memory, the controlling circuitry being constructed and arranged to:
    generate a set of geographical areas, each geographical area of the set of geographical areas (i) representing a fixed region bounded by a polygon having at least three latitude-longitude vertices on the Earth's surface and (ii) including an area identifier that uniquely identifies the geographical area from among other geographical areas;
    assign weights to each of the set of geographical areas, wherein each geographical area of the set of geographical areas includes a weight value that is inversely proportional to a likelihood of an electronic transaction being received from within that geographical area, an increasing weight value of a geographical area increasing a risk score assigned to the electronic transaction taking place within that geographical area, further wherein the weight value of one or more geographical areas of the set of geographical areas corresponds to a value less than any of the weight values of the other geographical areas of the set of the geographical areas based on previous electronic transactions received from within the one or more geographical areas being associated with a user device and/or a user of the user device;
    receive, from a service provider over a network, an electronic transaction relating to a computerized resource, the electronic transaction comprising GPS (Global Positioning Satellite) coordinates as location data of the user device in communication with the service provider, the location data corresponding to a single point on the Earth's surface as identified by the GPS coordinates;
    based on the received location data, identify a geographical area of the set of geographical areas, wherein the said identifying comprises mapping the location data to a particular geographical area of the set of geographical areas based on the GPS coordinates falling within the polygon bounded by the latitude-longitude vertices of the particular geographical area, the particular geographical area encompassing multiple GPS coordinates all of which map to the particular geographical area;

upon identifying the particular geographical area, determine geographical areas of the set of geographical areas adjacent the particular geographical area, each of the adjacent geographical areas encompassing multiple GPS coordinates;

determine the riskiness of the particular geographical area and the adjacent geographical areas, wherein the said determining comprises assessing previous electronic transaction from multiple users to determine an amount of fraud as a percentage of the total electronic transactions in the particular geographical area and the adjacent geographical areas;

generate an authentication result in connection with the electronic transaction, wherein the said generating of the authentication result comprises determining a risk score by analyzing the riskiness of the particular geographical area and the adjacent geographical areas in addition to analyzing a weight value associated with the particular geographical area; and send, over the network, the authentication result to the service provider;

wherein generating the set of geographical areas further includes:

determining a population associated with geographic areas in the set of geographical areas; and based on the said determination, scaling a first geographical area of the set of geographical areas such that the first geographical area is subdivided into subdivisions as a result of the first geographical area having a larger population than another geographic area in the set of geographical areas.

8. A system according to claim 7, wherein the set of geographical areas are mutually exclusive;

wherein identifying the geographical area includes:

producing, as the geographical area, the geographical area in which a single point of the Earth's surface is included.

9. A system according to claim 8, wherein producing the geographical area in which the point of the Earth's surface is included includes:

selecting, as the geographical area, the geographical area having the set of vertices which form a polygon that includes the single point of the Earth's surface.

10. A system according to claim 9, wherein the each geographical area of the set of geographical areas includes, as the set of vertices, four vertices which form, as the polygon, a spherical square having four edges and a center, each edge of the spherical square being parallel to either a longitude line of the Earth or a latitude line of the Earth; and wherein generating the set of geographical areas includes:

assigning an area identifier of each geographical area of the set of geographical areas based on the latitude and longitude of the center of the spherical square.

11. A system according to claim 7, wherein information in connection with previous transactions is stored in a database, an entry in the database for a previous transaction including a field for the area identifier and the authentication result;

wherein determining the riskiness of the identified geographical area includes:

sending a command to perform a lookup operation in the database for previous transactions having an area identifier being equal to the area identifier of the geographical area; and receiving the previous transactions having an area identifier being equal to the area identifier of the geographical area in response to the lookup operation.

12. A system according to claim 11, wherein determining the riskiness of the geographical area includes:

identifying, in the received previous transactions, the transactions having an authentication result indicative of risk; and producing an amount of the transactions having an authentication result indicative of risk in response to identifying the transactions having an authentication result indicative of risk.

13. A computer program product having a non-transitory, computer-readable storage medium which stores code for performing computerized authentication, the code including instructions to:

generate a set of geographical areas, each geographical area of the set of geographical areas (i) representing a fixed region bounded by a polygon having at least three latitude-longitude vertices on the Earth's surface and (ii) including an area identifier that uniquely identifies the geographical area from among other geographical areas;

assign weights to each of the set of geographical areas, wherein each geographical area of the set of geographical areas includes a weight value that is inversely proportional to a likelihood of an electronic transaction being received from within that geographical area, an increasing weight value of a geographical area increasing a risk score assigned to the electronic transaction taking place within that geographical area, further wherein the weight value of one or more geographical areas of the set of geographical areas corresponds to a value less than any of the weight values of the other geographical areas of the set of the geographical areas based on previous electronic transactions received from within the one or more geographical areas being associated with a user device and/or a user of the user device;

receive, from a service provider over a network, an electronic transaction relating to a computerized resource, the electronic transaction comprising GPS (Global Positioning Satellite) coordinates as location data of the user device in communication with the service provider, the location data corresponding to a single point on the Earth's surface as identified by the GPS coordinates;

based on the received location data, identify a geographical area of the set of geographical areas, wherein the said identifying comprises mapping the location data to a particular geographical area of the set of geographical areas based on the GPS coordinates falling within the polygon bounded by the latitude-longitude vertices of the particular geographical area, the particular geographical area encompassing multiple GPS coordinates all of which map to the particular geographical area;

upon identifying the particular geographical area, determine geographical areas of the set of geographical areas adjacent the particular geographical area, each of the adjacent geographical areas encompassing multiple GPS coordinates;

determine the riskiness of the particular geographical area and the adjacent geographical areas, wherein the said determining comprises assessing previous electronic transaction from multiple users to determine an amount of fraud as a percentage of the total electronic transactions in the particular geographical area and the adjacent geographical areas;

generate an authentication result in connection with the electronic transaction, wherein the said generating of the authentication result comprises determining a risk score by analyzing the riskiness of the particular geographical area and the adjacent geographical areas in addition to analyzing a weight value associated with the particular geographical area; and send, over the network, the authentication result to the service provider;

wherein generating the set of geographical areas further includes:

determining a population associated with geographic areas in the set of geographical areas; and based on the said determination, scaling a first geographical area of the set of geographical areas such that the first geographical area is subdivided into subdivisions as a result of the first geographical area having a larger population than another geographic area in the set of geographical areas.

14. A computer program product according to claim 13, wherein the set of geographical areas are mutually exclusive;

wherein identifying the geographical area includes:

producing, as the geographical area, the geographical area in which a single point of the Earth's surface is included.

15. A computer program product according to claim 14, wherein producing the geographical area in which the point of the Earth's surface is included includes:

selecting, as the geographical area, the geographical area having the set of vertices which form a polygon that includes the single point of the Earth's surface.

16. A computer program product according to claim 15, wherein the each geographical area of the set of geographical areas includes, as the set of vertices, four vertices which form, as the polygon, a spherical square having four edges and a center, each edge of the spherical square being parallel to either a longitude line of the Earth or a latitude line of the Earth; and wherein generating the set of geographical areas includes:

assigning an area identifier of each geographical area of the set of geographical areas based on the latitude and longitude of the center of the spherical square.

17. A computer program product according to claim 13, wherein information in connection with previous transactions is stored in a database, an entry in the database for a previous transaction including a field for the area identifier and the authentication result;

wherein determining the riskiness of the identified geographical area includes:

sending a command to perform a lookup operation in the database for previous transactions having an area identifier being equal to the area identifier of the geographical area; and receiving the previous transactions having an area identifier being equal to the area identifier of the geographical area in response to the lookup operation.

18. A computer program product according to claim 17, wherein determining the riskiness of the geographical area includes:

identifying, in the received previous transactions, the transactions having an authentication result indicative of risk; and producing an amount of the transactions having an authentication result indicative of risk in response to identifying the transactions having an authentication result indicative of risk.

* * * * *